(12) United States Patent
Hecht

(10) Patent No.: US 11,534,838 B1
(45) Date of Patent: Dec. 27, 2022

(54) INDEXABLE LAY-DOWN CUTTING INSERT HAVING A CENTRAL BODY PORTION AND THREE CIRCUMFERENTIALLY SPACED CUTTING PORTIONS, AND CUTTING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 25 days.

(21) Appl. No.: 17/341,991

(22) Filed: Jun. 8, 2021

(51) Int. Cl.
  *B23B 27/10*  (2006.01)
  *B23B 27/14*  (2006.01)
  *B23B 27/16*  (2006.01)

(52) U.S. Cl.
  CPC .... *B23B 27/164* (2013.01); *B23C 2200/0477* (2013.01); *B23C 2200/168* (2013.01); *B23C 2200/20* (2013.01)

(58) Field of Classification Search
  CPC .... B23C 2200/0416; B23C 2200/0483; B23C 2200/083; B23C 2200/085; B23C 2200/086; B23C 2200/128; B23C 2200/165; B23C 2200/168; B23C 2200/201; B23C 2200/08; B23C 2200/12; B23C 2200/20; B23C 5/202; B23C 5/205; B23C 2200/0477; B23C 2200/0466; B23C 2200/367; B23B 27/164
  See application file for complete search history.

(56) References Cited

U.S. PATENT DOCUMENTS

| 4,755,085 A | 7/1988 | Murén et al. |
| 5,931,613 A | 8/1999 | Larsson |
| 6,138,540 A * | 10/2000 | Niemi ................... B23B 27/065 407/113 |

(Continued)

FOREIGN PATENT DOCUMENTS

| DE | 19701555 A1 * | 7/1998 | ............... B23C 5/10 |
| DE | 19709436 A1 * | 9/1998 | ........... B23B 51/048 |

(Continued)

OTHER PUBLICATIONS

International Search Report dated Jul. 29, 2022, issued in PCT counterpart application (No. PCT/IL2022/050487).

(Continued)

*Primary Examiner* — Sara Addisu
(74) *Attorney, Agent, or Firm* — Womble Bond Dickinson (US) LLP

(57) ABSTRACT

In a cutting tool having an indexable lay-down cutting insert with a central body portion and three circumferentially spaced apart cutting portions, the cutting insert is removably secured to an elongated holding portion of an insert holder. Each cutting portion has a cutting edge with first and second cutting end points, the cutting edge formed at the intersection of an upward facing rake surface and a radially outward facing relief surface. In a top view of the cutting insert, parallel imaginary first and second vertical planes containing the first and second cutting end points, intersect the central body portion at first and second body side points, which are located first and second cutting distances from the first and (Continued)

second cutting end points, respectively. Each of the first and second cutting distances is greater than twenty-five percent of the first radius of an imaginary first circle circumscribing the cutting insert.

24 Claims, 7 Drawing Sheets

(56) References Cited

U.S. PATENT DOCUMENTS

| | | | | |
|---|---|---|---|---|
| 6,213,691 B1* | 4/2001 | Leeb | ................ | B23B 51/00 407/34 |
| 6,527,485 B1* | 3/2003 | Little | ................ | B23B 27/1622 407/24 |
| 8,734,064 B2* | 5/2014 | Koontz | ................ | B23B 27/04 407/103 |
| 9,421,622 B2* | 8/2016 | Segev | ................ | B23B 51/0063 |
| 9,457,413 B2* | 10/2016 | Matsumoto | ............. | B23C 5/202 |
| 2003/0180103 A1* | 9/2003 | Nagaya | ................ | B23C 5/2213 407/34 |
| 2004/0005199 A1* | 1/2004 | Janness | ................ | B23C 5/109 407/35 |
| 2008/0226403 A1* | 9/2008 | Craig | ................ | B23C 5/202 407/113 |
| 2008/0226404 A1* | 9/2008 | Nada | ................ | B23B 27/065 407/53 |
| 2009/0252565 A1* | 10/2009 | Morgulis | ............ | B23B 27/1622 76/101.1 |
| 2010/0329800 A1 | 12/2010 | Edler et al. | | |
| 2012/0201622 A1* | 8/2012 | Kocherovsky | ........ | B23C 5/2247 407/42 |
| 2013/0028671 A1* | 1/2013 | Hecht | ................ | B23B 27/065 407/77 |
| 2013/0336733 A1 | 12/2013 | Hecht et al. | | |
| 2013/0336734 A1* | 12/2013 | Morgulis | ............... | B23B 27/065 407/113 |
| 2014/0186130 A1* | 7/2014 | Hecht | ................ | B23B 29/043 407/103 |
| 2015/0273590 A1* | 10/2015 | Muthuswamy | ....... | B23B 29/043 407/66 |
| 2016/0082519 A1 | 3/2016 | Hecht | | |
| 2016/0107248 A1* | 4/2016 | Smycek | ................ | B23C 5/202 407/115 |
| 2019/0047061 A1 | 2/2019 | Ida et al. | | |
| 2019/0151964 A1* | 5/2019 | Men | ................ | B23C 5/202 |
| 2019/0255628 A1 | 8/2019 | Goto | | |
| 2020/0324345 A1 | 10/2020 | Maier et al. | | |

FOREIGN PATENT DOCUMENTS

| | | | | |
|---|---|---|---|---|
| EP | 2471618 A1 * | 7/2012 | ............. | B23C 5/109 |
| EP | 2805786 A1 * | 11/2014 | ............. | B23C 5/207 |
| WO | WO-2017170403 A1 * | 10/2017 | ............... | B23C 5/08 |

OTHER PUBLICATIONS

Written Opinion dated Jul. 29, 2022, issued in PCT counterpart application (No. PCT/IL2022/050487).

* cited by examiner

INDEXABLE LAY-DOWN CUTTING INSERT HAVING A CENTRAL BODY PORTION AND THREE CIRCUMFERENTIALLY SPACED CUTTING PORTIONS, AND CUTTING TOOL

FIELD OF THE INVENTION

The present invention relates to a cutting tool and an indexable lay-down cutting insert having a central body portion and three circumferentially spaced apart cutting portions therefor, for use in non-rotating cutting tool machining operations in general, and for broaching operations in particular.

BACKGROUND OF THE INVENTION

Within the field of cutting tools used in non-rotating cutting tool machining operations, there are many examples of indexable lay-down type cutting inserts removably retained in an insert receiving pocket of a tool holder.

U.S. Pat. No. 4,755,085 discloses an indexable cutting insert for recessing. The insert has a triangular basic shape and comprises three cutting edges. Each cutting edge is arranged at a projection which at least partly is asymmetrically arranged relative to a line parallel with the working direction of the insert. The insert has a good accessibility at work pieces having narrow spaces.

U.S. Pat. No. 5,931,613 discloses a cutting insert for the chipforming machining of metals mounted on a holder. A holding surface of the holder includes at least one rib extending in the longitudinal direction of the holder. The bottom surface of the insert includes at least one groove which receives the rib of the holder. The flanks of the rib and groove are inclined, whereby the insert is supported by those flanks. The bottom side of the insert further includes transverse surfaces extending perpendicular to the groove and which are adapted to engage corresponding transverse surfaces of the holding surface, in order to resist longitudinal forces applied to the cutting insert.

U.S. Pat. No. 6,527,485 discloses a triangular threading insert having a mount portion with three sides forming locating faces that lie on the three sides of an imaginary triangle and has three cutting arms with outer edges for cutting threads. The outer edge of each arm projects sidewardly beyond the sides of the imaginary triangle, to leave locating faces of long length. The top face of the mount portion forms a hexagon with the cutting arms projecting radially from three of the sides of the hexagon, and with the other three sides of the hexagon extending parallel to the locating faces of the mount portion. Each locating face has a smaller height than the thickness of the insert, with concave border regions merging the top and bottom of each locating face to the top and bottom faces of the insert, and merging horizontally-spaced ends of each locating face to a cutting arm.

US 2020/0324345 A1 discloses a tool system for machining including a tool body that has a first end for connecting to a machine tool and a second end having an end face on which a seat for an interchangeable cutting insert is formed. The cutting insert has an underside formed as an abutment surface, a top side formed as a rake face, and an encircling side face formed as a flank, and a cutting edge is formed at a transition from the top side to the encircling side face. The cutting insert is arranged on the seat such that the top side extends perpendicularly to the longitudinal axis of the tool body and the cutting edge protrudes beyond the outer circumference of the end face of the tool body in a radial direction with respect to the longitudinal axis with two usable cutting corners and cutting-corner portions adjoining the latter on both sides.

It is an object of the present invention to provide an improved indexable cutting insert and cutting tool.

It is also an object of the present invention to provide an indexable lay-down cutting insert capable of cutting a constant width keyway or channel in a workpiece.

It is a further object of the present invention to provide an indexable lay-down cutting insert having coolant grooves arranged such that cooling fluid can be accurately directed to any of its cutting portions.

It is yet a further object of the present invention to provide a non-rotating cutting tool with good support for the operative cutting portion.

It is still yet a further object of the present invention to provide a non-rotating cutting tool capable of performing internal machining operations in a workpiece having a relatively small bore size compared to the size of the cutting insert.

SUMMARY OF THE INVENTION

In accordance with the present invention, there is provided an indexable lay-down cutting insert comprising:

opposing upper and lower surfaces with a continuous peripheral side surface extending therebetween, and a central axis extending therethrough, the central axis defining an upward-to-downward direction, and a central body portion and three circumferentially spaced apart cutting portions radially protruding therefrom, the central body portion having lower body surface facing in the downward direction, and three circumferentially spaced apart radially outward facing central side surfaces, each cutting portion having a support surface facing in the downward direction, a rake surface facing in the upward direction, a radially outward facing relief surface extending between the rake surface and the support surface, and a cutting edge formed at the intersection of the rake surface and the relief surface, each cutting edge having first and second cutting end points, and each cutting portion further including:
an imaginary bisector plane containing the central axis and bisecting its cutting edge at a bisector cutting point; and
imaginary first and second vertical planes parallel to the imaginary bisector plane and containing the first and second cutting end points of said each cutting portion, respectively, wherein apart from containing the first and second cutting end points, the imaginary first and second vertical planes do not intersect their respective cutting portion, wherein, in a top view of the cutting insert:
the imaginary first and second vertical planes intersect two different central side surfaces of the central body portion adjacent their respective cutting portion at first and second body side points, respectively;
the first and second body side points are located first and second cutting distances from the first and second cutting end points, respectively; and
an imaginary first circle having a first radius circumscribes the cutting insert, and wherein:
each of the first and second cutting distances is greater than twenty-five percent of the first radius.

Also, in accordance with the present invention, there is provided a cutting tool comprising an insert holder and a cutting insert of the sort described above retained therein, the insert holder having an elongated holding portion extending away from a shank portion in a forward direction along a tool axis, the holding portion having a seating surface transverse to the tool axis at a front end thereof, the holding portion having longitudinally extending major and minor holding sub-portions, and the seating surface having major and minor seating sub-surfaces associated with the major and minor holding sub-portions, respectively, the cutting insert removably secured to the holding portion in one of three index positions by a fastening member, in each index position, exactly one cutting portion is operative and two cutting portions are non-operative, the operative cutting portion having an operative cutting edge, the support surfaces of the two non-operative cutting portions are in clamping contact with the major seating sub-surface; and the support surface of the operative cutting portion is in clamping contact with the minor seating sub-surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
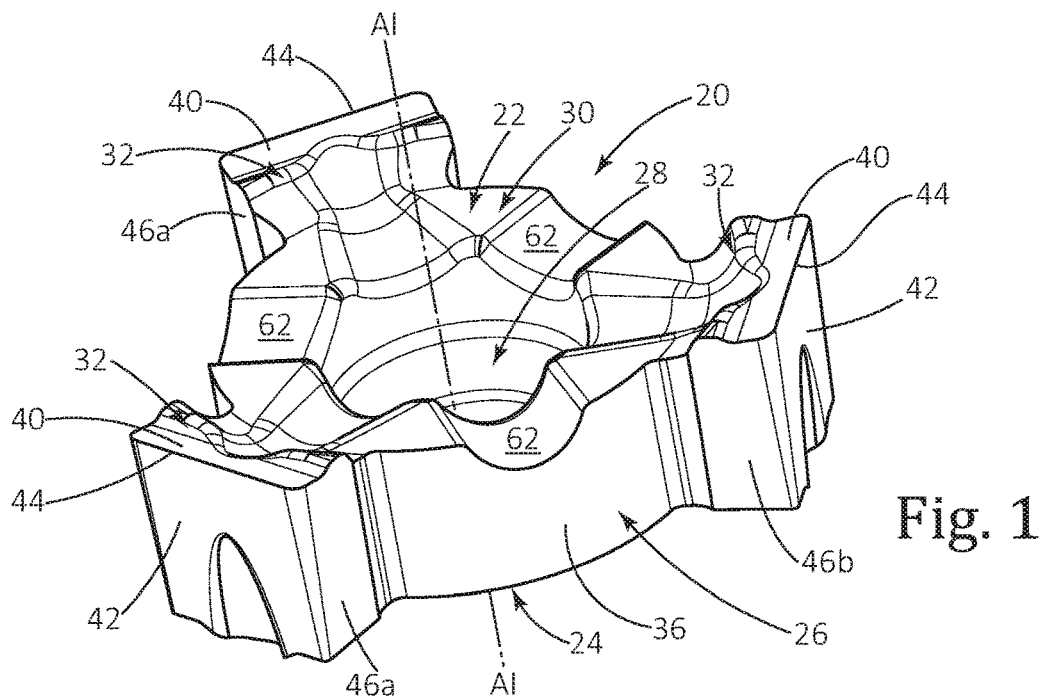
FIG. 1 is a perspective view of a cutting insert in accordance with some embodiments of the present invention.

Attention is first drawn to FIGS. 1 to 5, showing an indexable cutting insert 20 which may be manufactured by form pressing and sintering a cemented carbide, such as tungsten carbide, and may be coated or uncoated.

One aspect of the present invention relates to the cutting insert 20, which has opposing upper and lower surfaces 22, 24 with a continuous peripheral side surface 26 extending therebetween, and a central axis A1 extending therethrough, the central axis A1 defining an upward-to-downward direction DU, DD.

In some embodiments of the present invention, the cutting insert 20 may be indexable about the central axis A1.

Also, in some embodiments of the present invention, a through bore 28 coaxial to the central axis A1 may intersect the upper and lower surfaces 22, 24.

As shown in FIGS. 1 to 5 the cutting insert 20 includes a central body portion 30 and three circumferentially spaced apart cutting portions 32 radially protruding therefrom, with respect to the central axis A1.

In some embodiments of the present invention, the cutting insert 20 may have exactly three circumferentially spaced apart cutting portions 32.

Also, in some embodiments of the present invention, the cutting insert 20 may exhibit 3-fold rotational symmetry about the central axis A1.

As shown in FIGS. 1 to 5, the central body portion 30 has a lower body surface 34 facing in the downward direction DD, and three circumferentially spaced apart radially outward facing central side surfaces 36.

Also, as shown in FIGS. 1 to 5, each cutting portion 32 has a support surface 38 facing in the downward direction DD, a rake surface 40 facing in the upward direction DU, a radially outward facing relief surface 42 extending between the rake surface 40 and the support surface 38, and a cutting edge 44 formed at the intersection of the rake surface 40 and the relief surface 42, each cutting edge 44 having first and second cutting end points NE1, NE2.

It should be appreciated that by virtue of the central body portion's lower body surface 34 facing in the downward direction DD, and each cutting portion's rake surface 40 facing in the upward direction DU, the cutting insert 20 may be described as a lay-down cutting insert 20.

In some embodiments of the present invention, the three cutting edges 44 may define an imaginary first (upper) horizontal plane PH1 perpendicular to the central axis A1.

Figure 5:
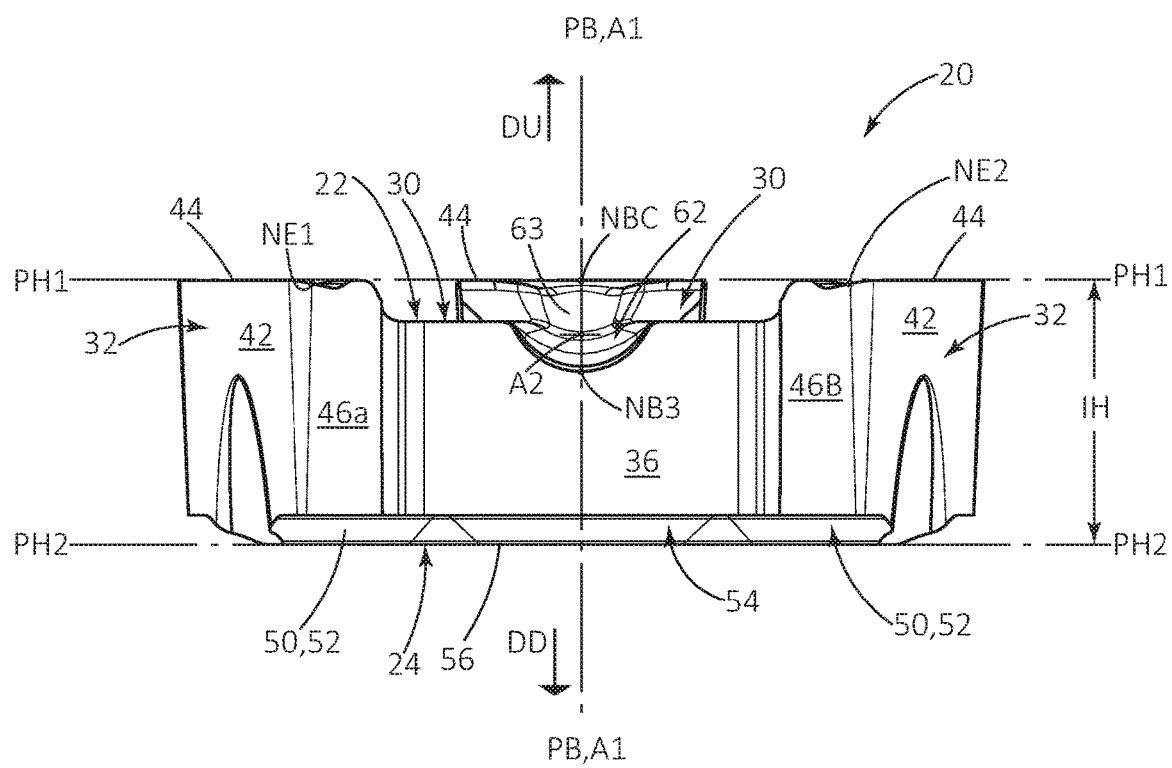
FIG. 5 is a side view of the cutting insert shown in FIG. 1.

As shown in FIG. 5, no part of the cutting insert 20 may be located axially forward of the imaginary first horizontal plane PH1.

In some embodiments of the present invention, the lower surface 24 may define an imaginary second (lower) horizontal plane PH2 perpendicular to the central axis A1.

As shown in FIG. 5, no part of the cutting insert 20 may be located axially rearward of the imaginary second horizontal plane PH2.

In some embodiments of the present invention, each central side surface 36 may be located between two circumferentially spaced apart cutting portions 32.

It should be appreciated that in some embodiments of the present invention, the three central side surfaces 36 and the three relief surfaces 42 may be sub-surfaces of the peripheral side surface 26.

Also, it should be appreciated that in some embodiments of the present invention, the lower body surface 34 and the three support surfaces 38 may be sub-surfaces of the lower surface 24.

Figure 2:
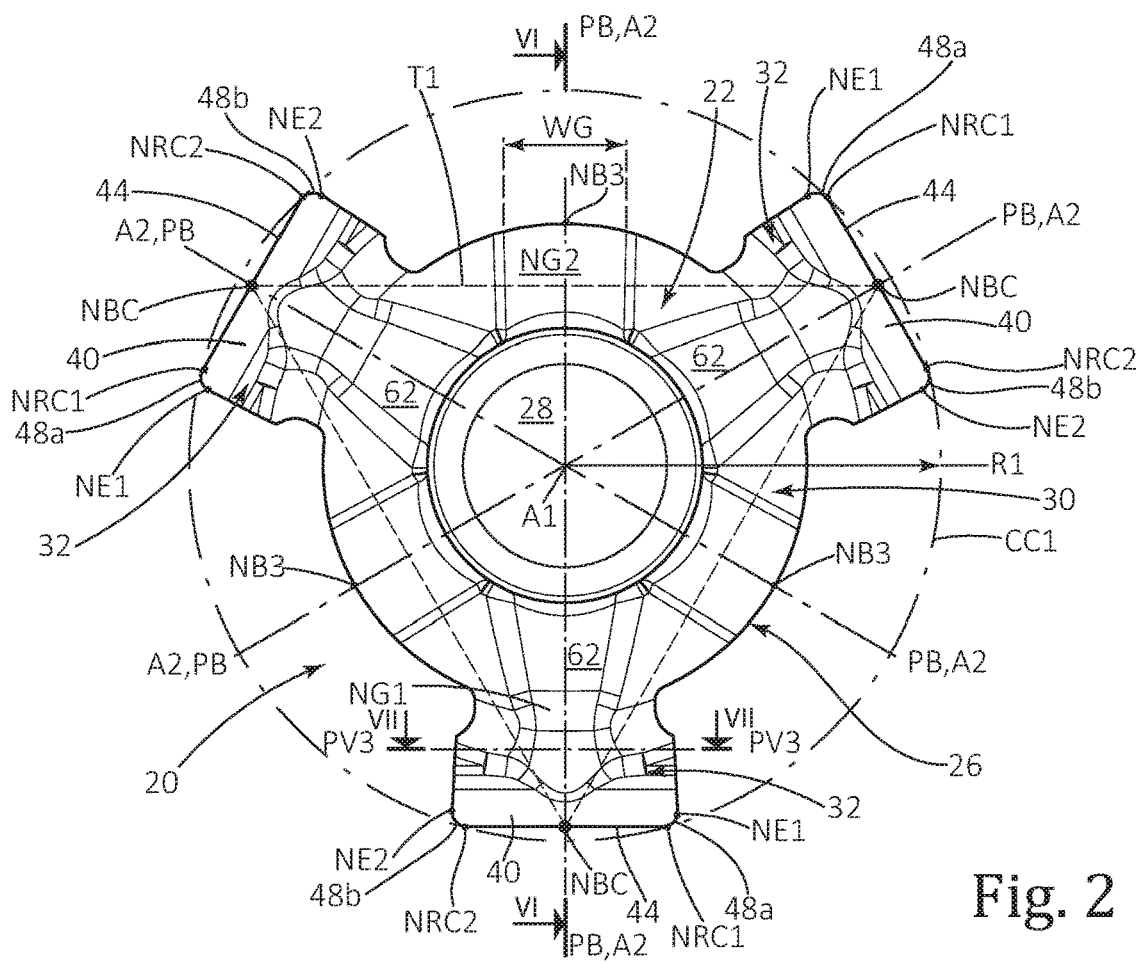
FIG. 2 is a top view of the cutting insert shown in FIG. 1.
Figure 3:
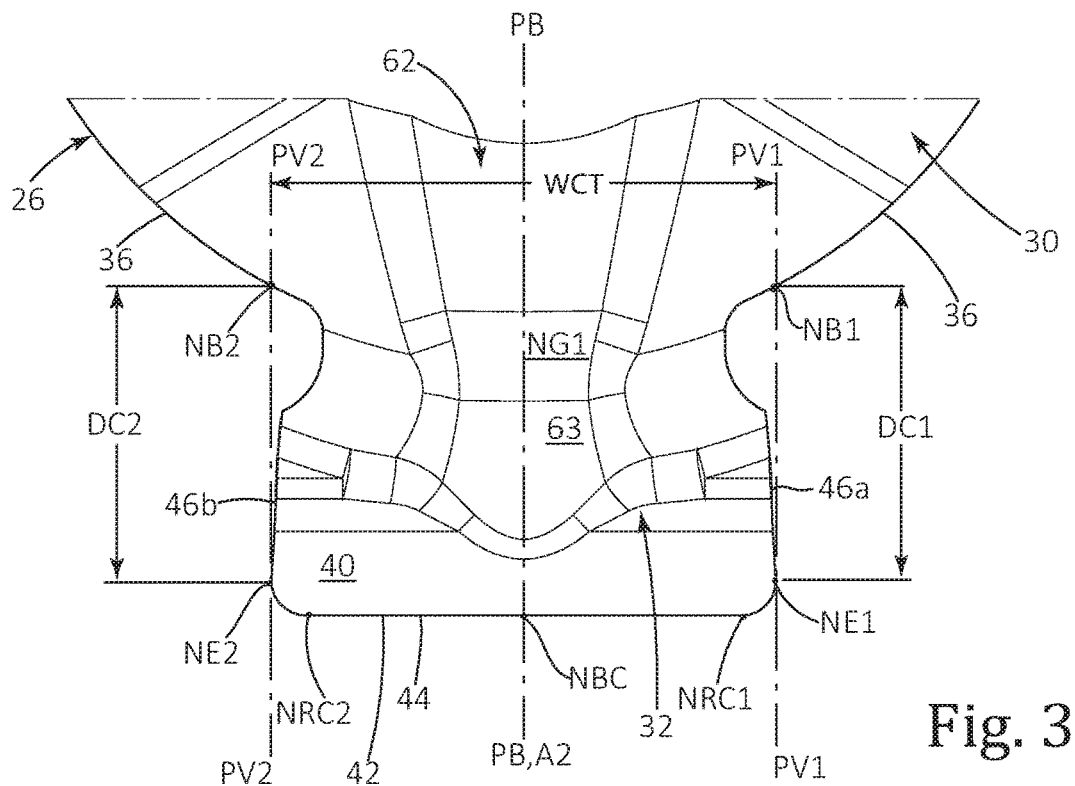
FIG. 3 is a detailed view of the cutting insert shown in FIG. 2.

As shown in FIGS. 2 and 3, each cutting portion 32 further includes an imaginary bisector plane PB containing the central axis A1 and bisecting its cutting edge 44 at a bisector cutting point NBC. The imaginary bisector plane PB may be perpendicular to its cutting edge 44 at the bisector cutting point NBC.

It should be appreciated throughout the description and claims, that each imaginary bisector plane PB may not necessarily divide its respective cutting edge 44 into two identical cutting-edge portions.

In some embodiments of the present invention, as shown in FIG. 5, the three bisector cutting points NBC may be contained in the imaginary first horizontal plane PH1.

Also, in some embodiments of the present invention, as shown in FIG. 5, the first and second cutting end points NE1, NE2 of each cutting edge 44 may be located axially rearward of the imaginary first horizontal plane PH1.

Figure 4:
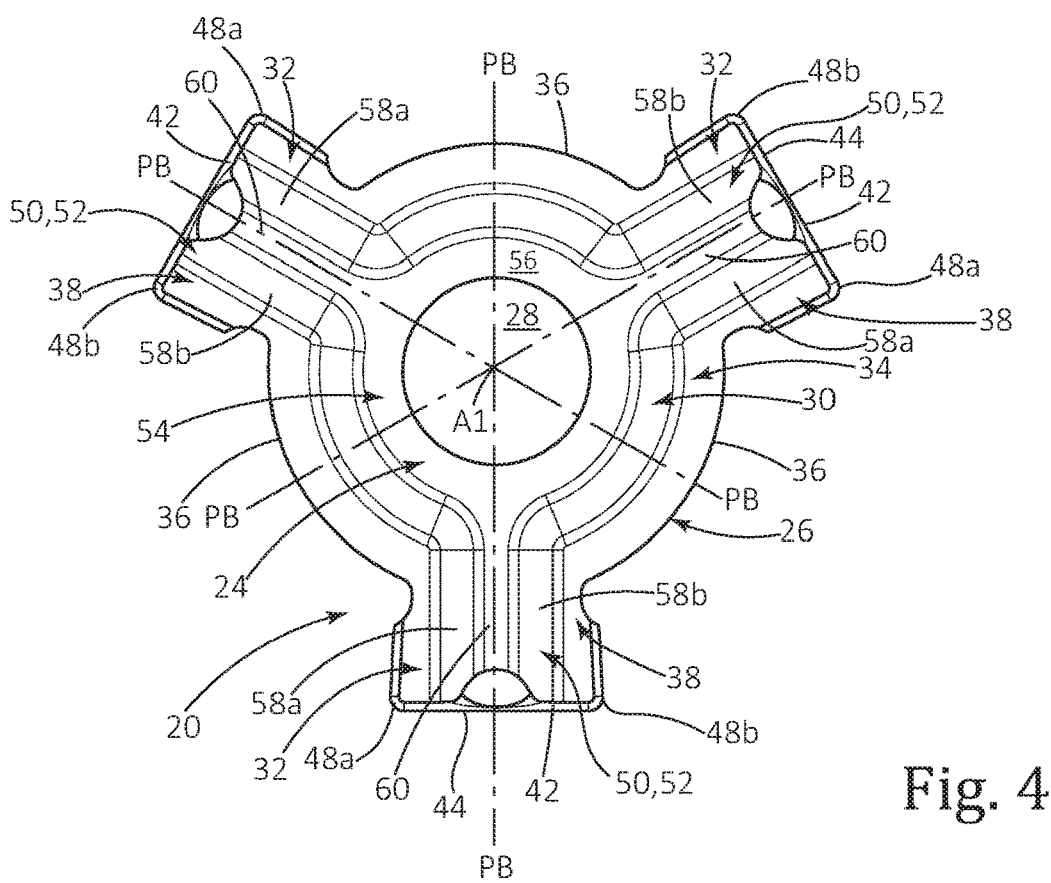
FIG. 4 is a bottom view of the cutting insert shown in FIG. 1.

Further, in some embodiments of the present invention, as shown in FIGS. 2 to 4, each cutting portion 32 may exhibit mirror symmetry about its imaginary bisector plane PB.

Figure 6:
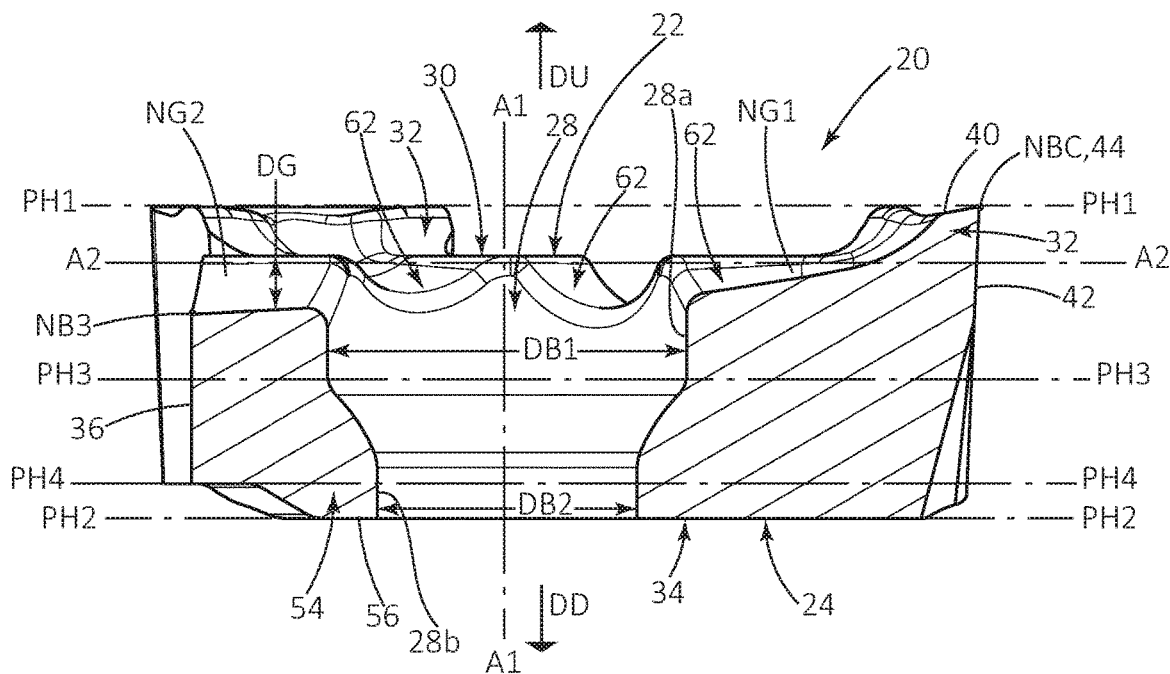
FIG. 6 is a cross-sectional view of the cutting insert shown in FIG. 2, taken along the line VI-VI.

As shown in FIG. 6, in a cross-sectional view of the cutting insert 20 taken in one of the imaginary bisector planes PB, the respective relief surface 42 may be inclined towards the central axis A1 in the downward direction DD.

As shown in FIGS. 1 to 5, each cutting portion 32 may include a pair of lateral clearance surfaces 46a, 46b located on opposite sides of its imaginary bisector plane PB.

In some embodiments of the present invention, each lateral clearance surface 46a, 46b may extend from its associated relief surface 42 to one of the central side surfaces 36.

It should be appreciated that in some embodiments of the present invention, the three pairs of lateral clearance surfaces 46a, 46b may be sub-surfaces of the peripheral side surface 26.

As shown in FIGS. 2 and 3, each cutting portion 32 further includes imaginary first and second vertical planes PV1, PV2 parallel to its imaginary bisector plane PB containing its first and second cutting end points NE1, NE2, respectively.

Apart from containing the first and second cutting end points NE1, NE2, the imaginary first and second vertical planes PV1, PV2 do not intersect their respective cutting portion 32, and each cutting portion 32 has a cutting width WCT defined by the distance between its imaginary first and second vertical planes PV1, PV2. Thus, the imaginary first and second vertical planes PV1, PV2 may be referred to as imaginary first and second vertical clearance planes PV1, PV2, and it should be appreciated that the cutting insert 20 may be technically capable of cutting a keyway or channel in a workpiece (not shown), having a constant channel width equal to the cutting width WCT.

In some embodiments of the present invention, the cutting width WCT may be greater than forty percent of the first radius R1, i.e. WCT>0.40*R1.

As shown in FIGS. 2 and 3, in a top view of the cutting insert 20, the imaginary first and second vertical planes PV1, PV2 intersect two different central side surfaces 36 of the central body portion 30 adjacent their respective cutting portion 32 at first and second body side points NB1, NB2, respectively, and the first and second body side points NB1, NB2 are located first and second cutting distances DC1, DC2 from the first and second cutting end points NE1, NE2, respectively.

For embodiments of the present invention, in which each cutting portion 32 exhibits mirror symmetry about its imaginary bisector plane PB, it should be appreciated that the first and second distances DC1, DC2 are equal.

In some embodiments of the present invention, each of the first and second cutting distances DC1, DC2 may be greater than twenty-five percent of the first radius R1, i.e. DC1>0.25*R1 and DC2>0.25*R1.

For embodiments of the present invention, in which each of the first and second cutting distances DC1, DC2 is greater than twenty-five percent of the first radius R1, it should be appreciated that the cutting insert 20 may be technically capable of cutting a keyway or channel in a workpiece (not shown), having a channel depth equal to the shortest of the first and second cutting distances DC1, DC2, and thus advantageously greater than twenty-five percent of the first radius R1. For such embodiments, it should be appreciated that the said keyway or channel may have a constant channel width equal to the cutting width WCT.

As shown in FIG. 2, in the top view of the cutting insert 20, an imaginary first circle CC1 having a first radius R1 circumscribes the cutting insert 20.

Also, as shown in FIG. 2, it should be appreciated that the imaginary first circle CC1 is defined by the cutting insert's three cutting edges 44.

In some embodiments of the present invention, the imaginary first circle CC1 may have a center coincident with the central axis A1.

Also, in some embodiments of the present invention, as shown in FIG. 2, two spaced apart radially outermost cutting points NRC1, NRC2 of each cutting edge 44 may lie on the imaginary first circle CC1.

Further, in some embodiments of the present invention, the three bisector cutting points NBC may be located inside the imaginary first circle CC1.

As shown in FIGS. 2 and 3, in the top view of the cutting insert 20, at least a portion of each cutting edge 44 extending between its two radially outermost cutting points NRC1, NRC2 may be linear and perpendicular to its respective imaginary bisector plane PB.

In some embodiments of the present invention, as shown in FIG. 3, the first and second cutting end points NE1, NE2 of each cutting edge 44 may be non-coincident with the two radially outermost cutting points NRC1, NRC2 of the same cutting edge 44 and located inside the imaginary first circle CC1.

For embodiments of the present invention, in which the first and second cutting end points NE1, NE2 of each cutting portion 32 are located inside the imaginary first circle CC1, each cutting edge 44 may have two curved end portions 48a, 48b.

As shown in FIG. 2, in the top view of the cutting insert 20, no part of the cutting insert 20 may be located outside the imaginary first circle CC1.

Also, as shown in FIG. 2, the three bisector cutting points NBC define three corner points of an imaginary equilateral triangle T1.

In some embodiments of the present invention, in the top view of the cutting insert 20, as shown in FIG. 2, each imaginary bisector plane PB may intersect one of the central side surfaces 36 at a third body side point NB3, on the opposite side of the central axis A1 from its associated cutting portion 32.

Also, in some embodiments of the present invention, the three third body side points NB3 may be located outside the imaginary equilateral triangle T1.

For embodiments of the present invention, in which the three third body side points NB3 are located outside the imaginary equilateral triangle T1, in the top view of the cutting insert 20, each of the central side surfaces 36 may be convex, and the central body portion 30 may have a substantially circular shape.

As shown in FIGS. 4 and 5, each support surface 38 may include a male or female type support element 50.

In some embodiments of the present invention, each support element 50 may be in the form of an elongated ridge 52, extending radially with respect to the insert axis A1.

Also, in some embodiments of the present invention, each support element 50 may be partially located on the lower body surface 34.

As shown in FIGS. 4 and 5, the lower body surface 34 may include a central boss 54 protruding therefrom.

In a bottom view of the cutting insert 20, as shown in FIG. 4, the central boss 54 may have a substantially circular shape.

For embodiments of the present invention, in which each support element 50 is in the form of the radially extending elongated ridge 52, each elongated ridge 52 may intersect the central boss 54.

In some embodiments of the present invention, as shown in FIG. 4, the three elongated ridges 52 may merge with the central boss 54 to form a single structural member extending to the radial outermost extent of the three support surfaces 38. This single structural member improves rigidity of the cutting insert 20 and advantageously reduces the susceptibility of the cutting insert 20 to fracture of deformation during clamping and machining operations.

Also, in some embodiments of the present invention, as shown in FIG. 5, the central boss 54 may have a raised boss end surface 56 coplanar with the imaginary second horizontal plane PH2.

In some embodiments of the present invention, the through bore 28 may intersect the raised boss end surface 56.

As shown in FIG. 5, the cutting insert 20 may have an insert height IH defined by the distance between the imaginary first and second horizontal planes PH1, PH2.

In some embodiments of the present invention, the insert height IH may be less than the first radius R1, i.e. IH<R1.

As shown in FIG. 6, the through bore 28 may include first and second bore portions 28a, 28b having different first and second bore diameters DB1, DB2 at imaginary third and fourth horizontal planes PH3, PH4 perpendicular to the central axis A1, respectively.

Also, as shown in FIG. 6, the imaginary third horizontal plane PH3 may be located axially upward of the imaginary fourth horizontal plane PH4, and the first bore diameter DB1 may be greater than the second bore diameter DB2, i.e. DB1>DB2.

In some embodiments of the present invention, the first bore diameter DB1 may be at least twenty-five percent greater than the second bore diameter DB2, i.e. DB1>DB2*1.25.

Also, in some embodiments of the present invention, the first bore diameter DB1 may be greater than half of the first radius R1 i.e. DB1>0.50*R1.

Further, in some embodiments of the present invention, the first bore diameter DB1 may be greater than the insert height IH, i.e. DB1>IH.

As shown in FIG. 6, the imaginary third and fourth horizontal planes PH3, PH4 may both be located closer to the imaginary second horizontal plane PH2 than the imaginary first horizontal plane PH1.

In some embodiments of the present invention, the second bore portion 28b may intersect the raised boss end surface 56.

As shown in FIG. 4, each support element 50 may include a pair of parallelly extending support flank surfaces 58a, 58b.

In some embodiments of the present invention, each pair of support flank surfaces 58a, 58b may intersect the respective cutting portion's relief surface 42.

Also, in some embodiments of the present invention, each support flank surface 58a, 58b may be planar.

Further, in some embodiments of the present invention, each pair of support flank surfaces 58a, 58b may be spaced apart by an intermediate surface 60.

Yet further, in some embodiments of the present invention, each intermediate surface 60 may be planar.

For embodiments of the present invention, in which each support element 50 is in the form of the radially extending elongated ridge 52, the intermediate surface 60 of each elongated ridge 52 may be contained in the imaginary second horizontal plane PH2.

Figure 7:
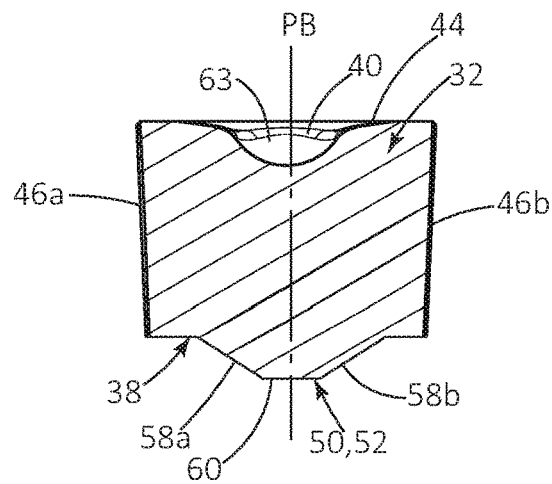
FIG. 7 is a cross-sectional view of the cutting insert shown in FIG. 2, taken along the line VII-VII.

As shown in FIG. 7, in a cross-sectional view of the cutting insert 20 taken in an imaginary third vertical plane PV3 perpendicular to one of the imaginary bisector planes PB and intersecting its associated support element 50, the respective pair of support flank surfaces 58a, 58b may form a V-shape.

In some embodiments of the present invention, the imaginary third vertical plane PV3 may be parallel to the central axis A1.

It should be appreciated that configuring each pair of support flank surfaces 58a, 58b to form a V-shape in a cross-section, enables the cutting insert 20 to be stably clamped to a mating body.

As shown in FIGS. 1 to 5, the upper surface 22 may include three linearly extending coolant grooves 62.

In some embodiments of the present invention, each coolant groove 62 may extend along a groove axis A2 transverse to the central axis A1.

Also, in some embodiments of the present invention, each coolant groove 62 may traverse the other two coolant grooves 62, such that coolant fluid flowing along any one of the coolant grooves 62 would cross the other two coolant grooves 62.

Further, in some embodiments of the present invention, as shown in FIG. 2, each coolant groove 62 may be interrupted by the through bore 28.

Although in some embodiments of the present invention each coolant groove 62 may be interrupted by the through bore 28, it should be appreciated that for embodiments in which the imaginary third and fourth horizontal planes PH3, PH4 are both located closer to the imaginary second horizontal plane PH2 than the imaginary first horizontal plane PH1, a fastening member 76 may advantageously occupy the through bore 28 without interrupting coolant fluid flow along the entire length of each coolant groove 62.

As shown in FIGS. 2 and 6, each coolant groove 62 may intersect one of the three cutting portions 32 at a first groove end region NG1.

For embodiments of the present invention, in which each of the three coolant grooves 62 intersects one of the three cutting portions 32, it should be appreciated that cooling fluid may be accurately directed to any of the three cutting portions 32.

In some embodiments of the present invention, each coolant groove 62 may taper along its groove axis A2 towards its first groove end region NG1.

Also, in some embodiments of the present invention, a ramp surface 63 may be located between each first groove end region NG1 and the associated cutting portion's rake surface 40.

As shown in FIGS. 2 and 6, each coolant groove 62 may intersect one of the central side surfaces 36 at a second groove end region NG2 distal from and on the opposite side of the central axis A1 from its first groove end region NG1.

In some embodiments of the present invention, each groove axis A2 may be contained in the imaginary bisector plane PB of its associated cutting portion 32.

Also, in some embodiments of the present invention, in the top view of the cutting insert 20, as shown in FIG. 2, the three second groove end regions NG2 may be located outside the imaginary equilateral triangle T1.

For embodiments of the present invention, in which the three second groove end regions NG2 are located outside the imaginary equilateral triangle T1, it should be appreciated that each coolant groove 62 may have a substantial groove extent on the opposite side of the central axis A1 from its first groove end region NG1.

In some embodiments of the present invention, each third body point NB3 may be located at one of the second groove end regions NG2.

As shown in FIG. 2, in the top view of the cutting insert 20, each coolant groove 62 has a groove width WG.

In some embodiments of the present invention, the groove width WG of each coolant groove 62 may decrease along its groove axis A2 towards its first groove end region NG1.

Also, in some embodiments of the present invention, the groove width WG of each coolant groove 62 may continually decrease from its second groove end region NG2 to its first groove end region NG1.

As shown in FIG. 6, in the cross-sectional view of the cutting insert 20 taken in one of the imaginary bisector planes PB, the associated coolant groove 62 has a groove depth DG.

In some embodiments of the present invention, the groove depth DG may decrease along its groove axis A2 towards its first groove end region NG1.

Also, in some embodiments of the present invention, the groove depth DG may continually decrease from its second groove end region NG2 to its first groove end region NG1.

Attention is now drawn to FIGS. 8 to 11, showing a cutting tool 64 according to another aspect of the present invention, comprising an insert holder 66 and the above described cutting insert 20 retained therein.

The insert holder 66 has an elongated holding portion 68 extending away from a shank portion 70 in a forward direction DF along a tool axis AT, and the holding portion 68 has a seating surface 72 transverse to the tool axis AT at a front end 74 thereof.

In some embodiments of the present invention, exactly one cutting insert 20 may be removably secured to the holding portion 68.

Also, in some embodiments of the present invention, the central axis A1 may be parallel to the tool axis AT.

As shown in FIGS. 8 to 11, the cutting insert 20 is removably secured to the holding portion 68 in any one of three index positions by the fastening member 76, the insert's lower surface 24 being in clamping contact with the holding portion's seating surface 72, and exactly one cutting portion 32 is operative in each index position.

In some embodiments of the present invention, the cutting tool 64 may be configured to perform machining operations without rotating about the tool axis AT and may therefore be described as a non-rotating cutting tool 64.

Figure 10:
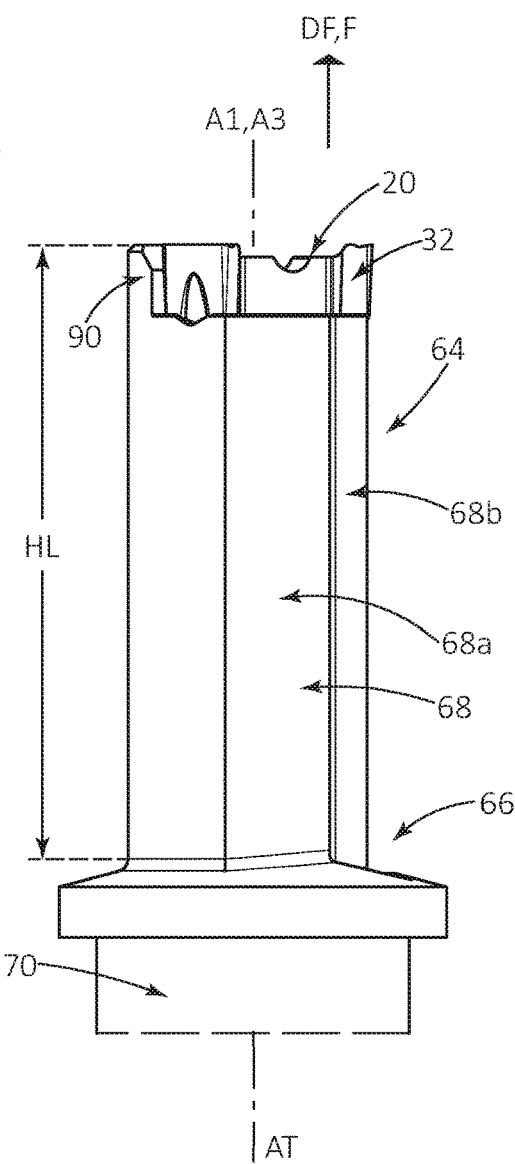
FIG. 10 is a side view of the cutting tool shown in FIG. 8.

As shown in FIG. 10, the holding portion 68 has a holding length HL along the tool axis AT.

In some embodiments of the present invention, the holding length HL may be greater than three times the first radius R1, i.e. HL>R1*3.

Figure 8:
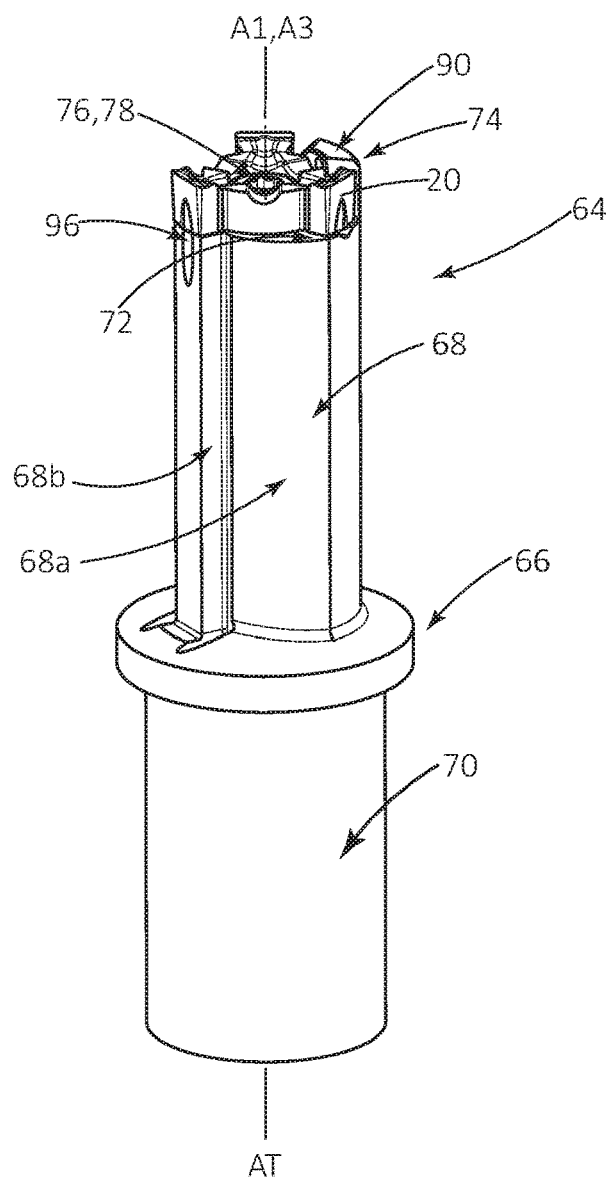
FIG. 8 is a perspective view of a cutting tool in accordance with some embodiments of the present invention.
Figure 9:
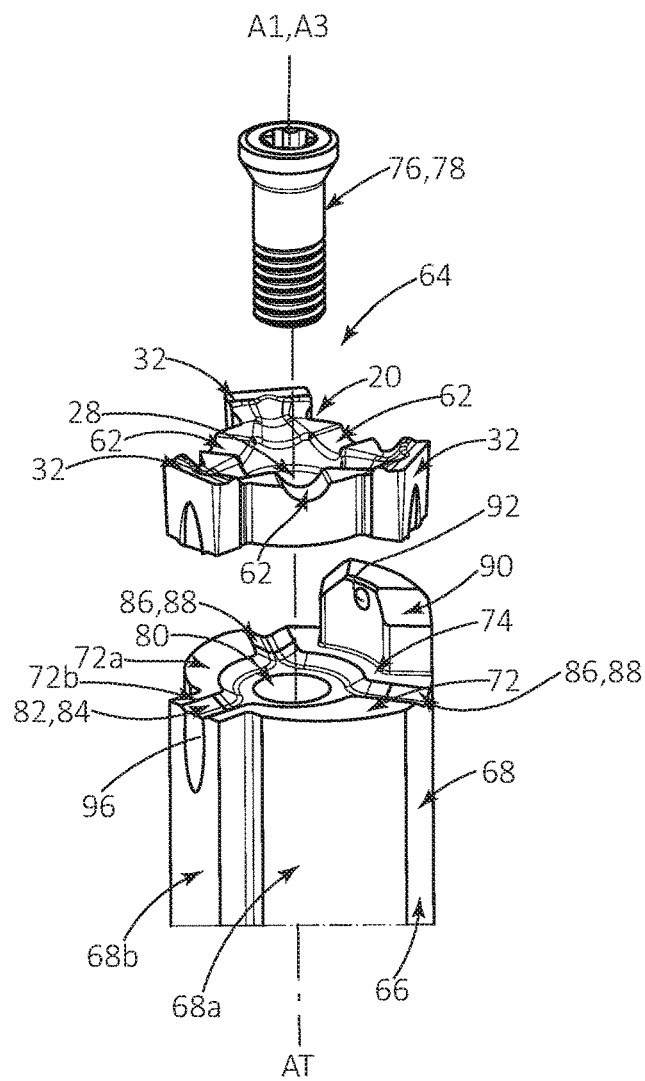
FIG. 9 is an exploded view of the cutting tool shown in FIG. 8.

As shown in FIGS. 8 to 10, the holding portion 68 may have longitudinally extending major and minor holding sub-portions 68a, 68b, and the seating surface 72 may have major and minor seating sub-surfaces 72a, 72b associated with the major and minor holding sub-portions 68a, 68b, respectively.

In some embodiments of the present invention, the fastening member 76 may be in the form of a clamping screw 78 passing through the cutting insert's through bore 28 and threadingly engaging a screw bore 80 in the major seating sub-surface 72a.

Also, in some embodiments of the present invention, the screw bore 80 may have a screw axis A3 coaxial to the central axis A1.

Figure 12:
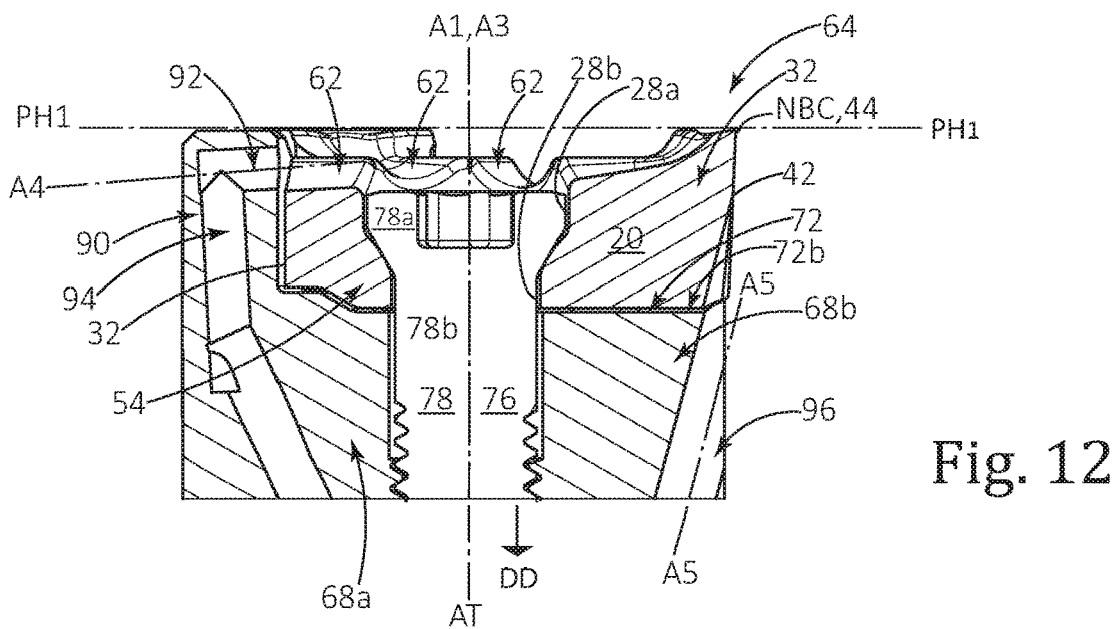
FIG. 12 is a cross-sectional view of the cutting insert shown in FIG. 11, taken along the line XII-XII.

Further, in some embodiments of the present invention, as shown in FIG. 12, the clamping screw 78 may be entirely located axially rearward of the cutting insert's single operative cutting edge 44, along the tool axis AT.

Yet further, in some embodiments of the present invention, the clamping screw 78 may be entirely located axially rearward of the cutting insert's three coolant grooves 62, along the tool axis AT.

Although in some embodiments of the present invention each coolant groove 62 may be interrupted by the through bore 28, it should be appreciated that for embodiments in which the clamping screw 78 is entirely located axially rearward of the cutting insert's three coolant grooves 62, the clamping screw 78 may advantageously occupy the through bore 28 without interrupting coolant fluid flow along the entire length of each coolant groove 62.

As shown in FIG. 9, the clamping screw 78 may have a head portion 78a and an elongated threaded shank portion 78b extending therefrom.

In some embodiments of the present invention, as shown in FIG. 12, the clamping screw's head portion 78a may occupy the through bore's first bore portion 28a, and a part of the clamping screw's shank portion 78b may occupy the through bore's second bore portion 28b.

Figure 11:
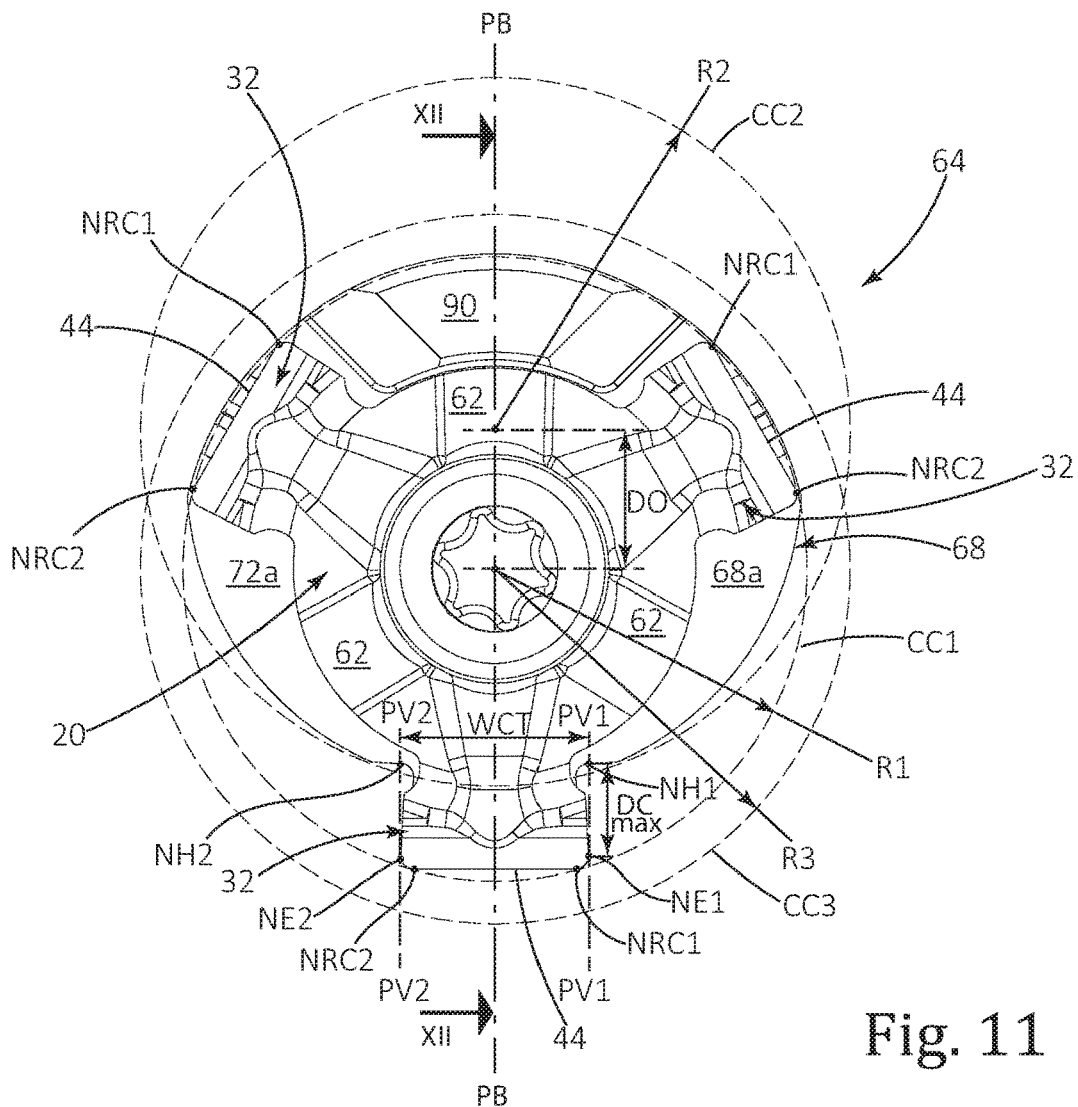
FIG. 11 is an end view of the cutting tool shown in FIG. 8.

As shown in FIG. 11, in an end view of the cutting tool 64, the imaginary first and second vertical planes PV1, PV2 of the single operative cutting portion 32 intersect the major holding sub-portion 68a at first and second major holding points NH1, NH2, respectively.

In some embodiments of the present invention, the imaginary first and second vertical planes PV1, PV2 of the single operative cutting portion 32 may not intersect the insert holder's minor holding sub-portion 68b.

As shown in FIG. 11, in the end view of the cutting tool 64, the single operative cutting portion 32 has a maximum cutting depth $DC_{MAX}$ defined as the shortest distance between either of its associated first and second cutting end points NE1, NE2 and the first and second major holding points NH1, NH2, respectively.

In some embodiments of the present invention, the maximum cutting depth $DC_{MAX}$ may be greater than twenty percent of the first radius R1, i.e. $DC_{MAX}>0.20*R1$.

For embodiments of the present invention, in which the maximum cutting depth $DC_{MAX}$ is greater than twenty percent of the first radius R1, it should be appreciated that the cutting tool 64 may be capable of cutting a keyway or channel in a workpiece (not shown) having a channel depth equal to the maximum cutting depth $DC_{MAX}$, and thus advantageously greater than twenty percent of the first radius R1. For such embodiments, it should be appreciated that the said keyway or channel may have a constant channel width equal to the cutting width WCT.

Figure 13:
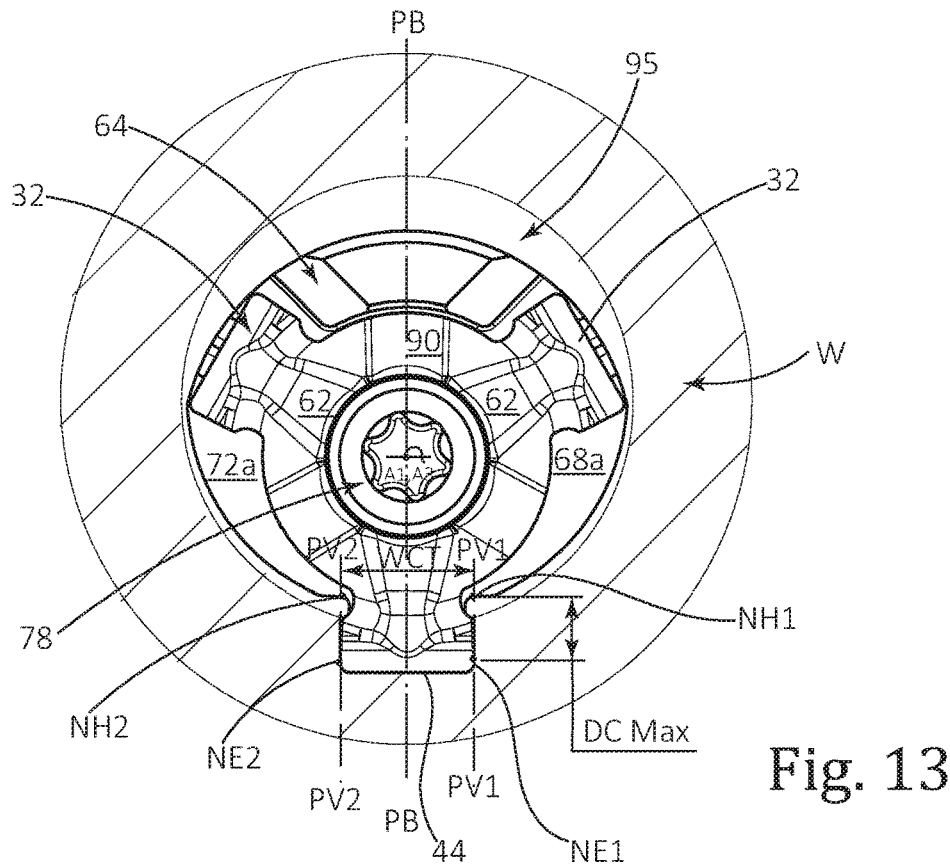
FIG. 13 is an end view of the cutting tool shown in FIG. 8, during a machining operation in a workpiece.
Figure 14:
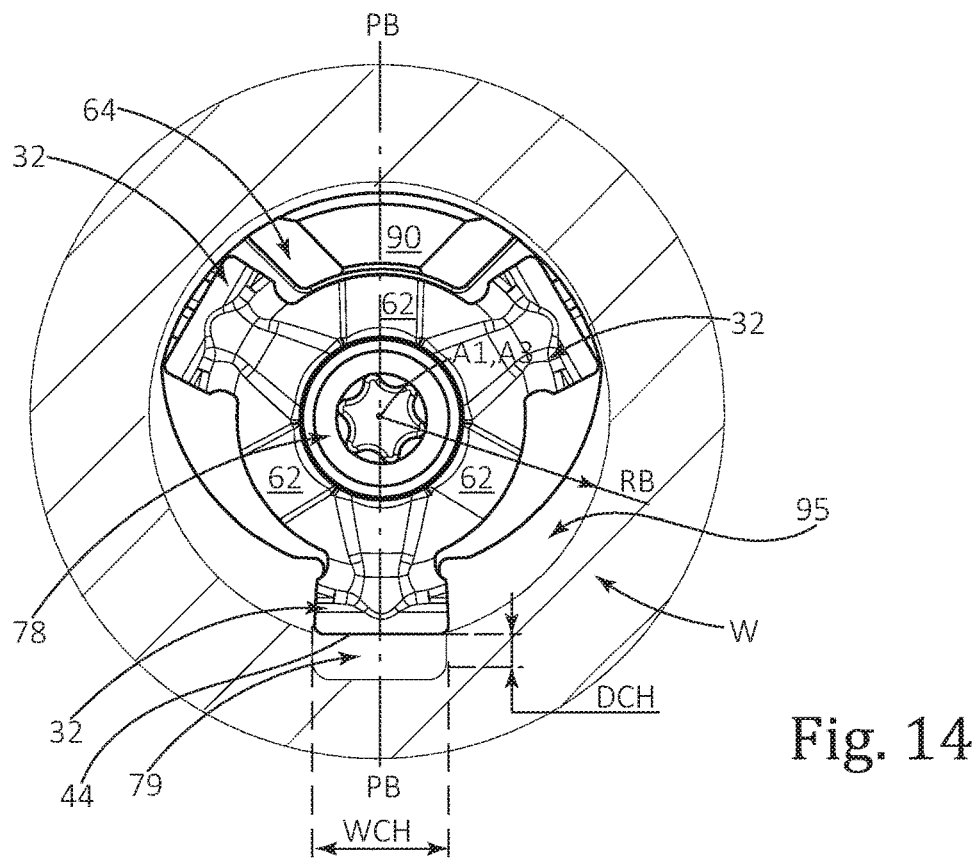
FIG. 14 is an end view of the cutting tool shown in FIG. 8, after a machining operation in the workpiece.

In some embodiments of the present invention, as shown in FIGS. 10, 13 and 14, the cutting tool 64 may be configured to machine a stationary workpiece W along a feed direction F parallel to the tool axis AT.

For embodiments of the present invention, in which the cutting tool 64 is configured to machine the stationary workpiece W along the feed direction F parallel to the tool axis AT, the cutting tool 64 may be advantageously configured to perform broaching operations.

As shown in FIGS. 8 and 9, the two support surfaces 38 of the two non-operative cutting portions 32 are in clamping contact with the major seating sub-surface 72a, and the support surface 38 of the single operative cutting portion 32 is in clamping contact with the minor seating sub-surface 72b.

For embodiments of the present invention, in which the single operative cutting portion 32 is in clamping contact with the minor seating sub-surface 72b, it should be appreciated that cutting forces associated with machining operations in which the feed direction F is parallel to the tool axis AT, e.g. broaching operations, are advantageously absorbed into the insert holder 66 via the minor holding sub-portion 68b, thus providing a good support for the single operative cutting portion 32.

For embodiments of the present invention, in which each support surface 38 includes a male or female type support element 50, a corresponding female or male minor bearing element 82 of the minor seating sub-surface 72b may be in clamping contact with the support element 50 of the single operative cutting portion 32.

As shown in FIGS. 9 and 12, the minor bearing element 82 may be in the form of a minor bearing groove 84.

For embodiments of the present invention, in which each support surface 38 includes a male or female type support element 50, corresponding female or male major bearing elements 86 of the major seating sub-surface 72a may be in clamping contact with the support elements 50 of the two non-operative cutting portions 32.

As shown in FIG. 9, the two major bearing elements 86 may be in the form of two major bearing grooves 88.

For embodiments of the present invention, in which the male or female type support elements 50 of all of the three support surfaces 38 are in clamping contact with corresponding female or male major and minor bearing elements 82, 86 of the major and minor seating sub-surfaces 72a, 72b, respectively, it should be appreciated that the cutting tool 64 may advantageously provide a stable clamping arrangement for machining operations, including machining operations in which cutting forces are directed transversely with respect to the tool axis AT.

In some embodiments of the present invention, as shown in FIG. 12, it should be appreciated that the central boss 54 may not make contact with the holding portion's seating surface 72.

Also, in some embodiments of the present invention, the insert's peripheral side surface 26 may not make contact with any portion of the holding portion 68.

For embodiments of the present invention, in which the insert's peripheral side surface 26 does not make contact with any portion of the holding portion 68, and the screw axis A3 is coaxial to the central axis A1, it should be appreciated that clamping forces associated with tightening of the clamping screw 78 may be directed along the central and screw axes A1, A3, with no transverse eccentric clamping component.

As shown in FIGS. 8 to 12, the major holding sub-portion 68a may have a front protuberance 90 extending axially forwardly from the major seating sub-surface 72a.

In some embodiments of the present invention, as shown in FIG. 12, the front protuberance 90 may be entirely located axially rearward of the cutting insert's single operative cutting edge 44, along the tool axis AT.

For embodiments of the present invention, in which both the clamping screw 78 and the front protuberance 90 are entirely located axially rearward of the cutting insert's single operative cutting edge 44, along the tool axis AT, the single operative cutting edge 44 may constitute the axially forwardmost element of the cutting tool 64, along the tool axis AT.

For such embodiments, the cutting tool 64 may be advantageously configured for performing machining operations with limited space, e.g. broaching a blind internal keyway. Also, for embodiments in which the central axis A1 is parallel to the tool axis AT, and thus the first horizontal plane PiII is perpendicular to the tool axis AT, it should be appreciated that the cutting insert's three cutting edges 44 may simultaneously constitute the axially forwardmost elements of the cutting tool 64, along the tool axis AT.

In some embodiments of the present invention, as shown in FIG. 12, the front protuberance 90 may include a top coolant exit passage 92 extending along a top coolant exit axis A4 transverse to the tool axis AT.

Also, in some embodiments of the present invention, the top coolant exit passage 92 may communicate with the coolant groove 62 associated with the single operative cutting portion 32.

Further, in some embodiments of the present invention, the top coolant exit passage 92 may be aligned with the coolant groove 62 associated with the single operative cutting portion 32.

As shown in FIGS. 11 and 12, the top coolant exit axis A4 may be contained in the imaginary bisector plane PB associated with the single operative cutting portion 32.

In some embodiments of the present invention, the front protuberance 90 may include a top coolant supply passage 94 which communicates with the top coolant exit passage 92 and extends axially rearwardly therefrom.

As shown in FIG. 11, in the end view of the cutting tool 64, a center of an imaginary second circle CC2 having a second radius R2 ten percent greater than the first radius R1, i.e. R2=R1*1.10, is offset from the center of the imaginary first circle CC1 in a direction away from the single operative cutting portion 32 by an offset distance DO.

In some embodiments of the present invention, the center of the imaginary second circle CC2 is contained in the imaginary bisector plane PB associated with the single operative cutting portion 32.

Also, in some embodiments of the present invention, the imaginary second circle CC2 may contain the insert holder's major holding sub-portion 68a.

As shown FIG. 11, no part of the insert holder's major holding sub-portion 68a may extend outside the imaginary second circle CC2.

In some embodiments of the present invention, the imaginary second circle CC2 may contain the insert's central body portion 30 and two non-operative cutting portions 32.

As shown FIG. 11, no part of the insert's central body portion 30 and two non-operative cutting portions 32 may extend outside the imaginary second circle CC2.

In some embodiments of the present invention, the offset distance DO may be greater than thirty percent of the first radius R1, i.e. DO>0.30*R1.

For embodiments of the present invention, in which the offset distance DO is greater than thirty percent of the first radius R1, and the imaginary second circle CC2 contains the insert holder's major holding sub-portion 68a and the insert's central body portion 30 and two non-operative cutting portions 32, it should be appreciated that the cutting tool 64 may be advantageously configured to perform broaching operations at cutting depths equal to or greater than twenty percent of the first radius R1. For such embodiments, it should be appreciated that the imaginary first and second vertical planes PV1, PV2 of the single operative cutting portion 32 do not intersect the insert holder's minor holding sub-portion 68b.

As shown in FIG. 11, in the end view of the cutting tool 64, an imaginary third circle CC3 having a third radius R3 ten percent greater than the first radius R1, i.e. R3=R1*1.10, and a center coincident with the cutting insert's central axis A1 may contain the entire holding portion 68.

For embodiments of the present invention, in which the imaginary third circle CC3 contains the entire holding portion 68 in the end view of the cutting tool 64, and the holding length HL is greater than three times the first radius R1, it should be appreciated that the cutting tool 64 may be advantageously radially compact, and suitably configured to perform internal machining operations in the workpiece W.

As shown in FIGS. 13 and 14, the workpiece W may have a workpiece bore 95 with a bore radius RB which is relatively small compared to the size of the cutting insert 20.

In some embodiments of the present invention, the bore radius RB may be greater than the first radius R1 and less than the third radius R3, i.e. R1<RB<R3.

As shown in FIGS. 13 and 14, the cutting tool 64 may be capable of cutting an inner channel 79 in the workpiece W having a constant channel width WCH equal to the cutting width WCT, and a channel depth DCH which is only slightly less than the maximum cutting depth $DC_{MAX}$ due to the curvature of the workpiece bore 95 adjacent the inner channel 79.

As shown in FIGS. 8, 9 and 12, the minor holding sub-portion 68b may include a bottom coolant exit passage 96 extending along a bottom coolant exit axis A5.

In some embodiments of the present invention, the bottom coolant exit axis A5 may be contained in the imaginary bisector plane PB associated with the single operative cutting portion 32 and diverge away from the tool axis AT in the forward direction DF.

Also, in some embodiments of the present invention, the bottom coolant exit passage 96 may partially intersect the minor seating sub-surface 72b.

Although the present invention has been described to a certain degree of particularity, it should be understood that various alterations and modifications could be made without departing from the spirit or scope of the invention as hereinafter claimed.

What is claimed is:

1. An indexable lay-down cutting insert (20) comprising:
opposing upper and lower surfaces (22, 24) with a continuous peripheral side surface (26) extending therebetween, and a central axis (A1) extending therethrough, the central axis (A1) defining an upward-to-downward direction (DU, DD), and a central body portion (30) and three circumferentially spaced apart cutting portions (32) radially protruding therefrom,
the central body portion (30) having lower body surface (34) facing in the downward direction (DD), and three circumferentially spaced apart radially outward facing central side surfaces (36),
each cutting portion (32) having a support surface (38) facing in the downward direction (DD), a rake surface (40) facing in the upward direction (DU), a radially outward facing relief surface (42) extending between the rake surface (40) and the support surface (38), and a cutting edge (44) formed at the intersection of the rake surface (40) and the relief surface (42), each cutting edge (44) having first and second cutting end points (NE1, NE2), and
each cutting portion (32) further including:
an imaginary bisector plane (PB) containing the central axis (A1) and bisecting its cutting edge (44) at a bisector cutting point (NBC); and
imaginary first and second vertical planes (PV1, PV2) parallel to the imaginary bisector plane (PB) and containing the first and second cutting end points (NE1, NE2) of said each cutting portion (32), respectively,
wherein apart from containing the first and second cutting end points (NE1, NE2), the imaginary first and second vertical planes (PV1, PV2) do not intersect their respective cutting portion (32),
wherein, in a top view of the cutting insert (20):
the imaginary first and second vertical planes (PV1, PV2) intersect two different central side surfaces (36) of the central body portion (30) adjacent their respective cutting portion (32) at first and second body side points (NB1, NB2), respectively;
the first and second body side points (NB1, NB2) are located first and second cutting distances (DC1, DC2) from the first and second cutting end points (NE1, NE2), respectively; and
an imaginary first circle (CC1) defined by the three cutting edges (44) circumscribes the cutting insert (20), and has a first radius (R1)
and wherein: the three bisector cutting points (NBC) are located inside the imaginary first circle (CC1); and
each of the first and second cutting distances (DC1, DC2) is greater than twenty-five percent of the first radius (R1).

2. The cutting insert (20) according to claim 1, wherein in the top view of the cutting insert (20):
each imaginary bisector plane (PB) intersects one of the central side surfaces (36) at a third body side point (NB3) on the opposite side of the central axis (A1) from its associated cutting portion (32).

3. The cutting insert (20) according to claim 2, wherein:
the three bisector cutting points (NBC) define three corner points of an imaginary equilateral triangle (T1); and
in the top view of the cutting insert (20), the three third body side points (NB3) are located outside the imaginary equilateral triangle (T1).

4. The cutting insert (20) according to claim 1, wherein each support surface (38) includes a male or female type support element (50).

5. The cutting insert (20) according to claim 4, wherein each support element (50) is in the form of a radially extending elongated ridge (52), with respect to the insert axis (A1).

6. The cutting insert (20) according to claim 1, wherein:
each cutting portion (32) has a cutting width (WCT) defined by the distance between its imaginary first and second vertical planes (PV1, PV2), and
the cutting width (WCT) is greater than forty percent of the first radius (R1).

7. The cutting insert (20) according to claim 1, wherein each cutting portion (32) exhibits mirror symmetry about its imaginary bisector plane (PB).

8. The cutting insert (20) according to claim 1, wherein:
the upper surface (22) includes three linearly extending coolant grooves (62), and
each coolant groove (62) traverses the other two coolant grooves (62).

9. The cutting insert (20) according to claim 8, wherein:
each coolant groove (62) extends along a groove axis (A2) transverse to the central axis (A1), and
each coolant groove (62) intersects one of the three cutting portions (32) at a first groove end region (NG1).

10. The cutting insert (20) according to claim 8, wherein:
a through bore (28) coaxial to the central axis (A1) intersects the upper and lower surfaces (22, 24), and
each coolant groove (62) is interrupted by the through bore (28).

11. The cutting insert (20) according to claim 10, wherein:
the three cutting edges (44) defines an imaginary first horizontal plane (PH1) perpendicular to the central axis (A1);
the lower surface (24) defines an imaginary second horizontal plane (PH2) perpendicular to the central axis (A1);
the through bore (28) includes first and second bore portions (28a, 28b) having different first and second bore diameters (DB1, DB2) at cross-sections taken in imaginary third and fourth horizontal planes (PH3, PH4) perpendicular to the central axis (A1), respectively;
the imaginary third horizontal plane (PH3) is located axially upward of the imaginary fourth horizontal plane (PH4);
the first bore diameter (DB1) is at least twenty-five percent greater than the second bore diameter (DB2); and
the imaginary third and fourth horizontal planes (PH3, PH4) are both located closer to the imaginary second horizontal plane (PH2) than the imaginary first horizontal plane (PH1).

12. The cutting insert (20) according to claim 1, wherein the imaginary bisector plane (PB) is perpendicular to the cutting edge (44) at the bisector cutting point (NBC).

13. A cutting tool (64) comprising an insert holder (66) and the cutting insert (20) in accordance with claim 1 retained therein.

14. The cutting tool (64) according to claim 13, wherein:
the insert holder (66) has an elongated holding portion (68) extending away from a shank portion (70) in a forward direction (DF) along a tool axis (AT), the holding portion (68) having a seating surface (72) transverse to the tool axis (AT) at a front end (74) thereof,
the holding portion (68) having longitudinally extending major and minor holding sub-portions (68a, 68b), and the seating surface (72) having major and minor seating sub-surfaces (72a, 72b) associated with the major and minor holding sub-portions (68a, 68b), respectively,
the cutting insert (20) is removably secured to the holding portion (68) in one of three index positions by a fastening member (76),
in each index position, exactly one cutting portion (32) is operative and two cutting portions (32) are non-operative, the operative cutting portion having an operative cutting edge (44),
the support surfaces (38) of the two non-operative cutting portions (32) are in clamping contact with the major seating sub-surface (72a); and
the support surface (38) of the operative cutting portion (32) is in clamping contact with the minor seating sub-surface (70b).

15. The cutting tool (64) according to claim 14, wherein:
each support surface (38) includes a male or female type support element (50), and
a corresponding female or male minor bearing element (82) of the minor seating sub-surface (72b) is in clamping contact with the support element (50) of the operative cutting portion (32).

16. The cutting tool (64) according to claim 14, wherein the peripheral side surface (26) does not make contact with any portion of the holding portion (68).

17. The cutting tool (64) according to claim 14, wherein:
a through bore (28) coaxial to the central axis (A1) intersects the insert's upper and lower surfaces (22, 24),
the fastening member (76) is in the form of a clamping screw (78) which passes through the cutting insert's through bore (28) and threadingly engages a screw bore (80) in the major seating sub-surface (72a), and
the screw bore (80) has a screw axis (A3) coaxial to the central axis (A1).

18. The cutting tool (64) according to claim 17, wherein:
the insert's upper surface (22) includes three linearly extending coolant grooves (62),
each coolant groove (62) extends along a groove axis (A2) transverse to the central axis (A1) and is interrupted by the through bore (28), and
each coolant groove (62) intersects one of the three cutting portions (32) at a first groove end region (NG1).

19. The cutting tool (64) according to claim 18, wherein the clamping screw (78) is entirely located axially rearward of the three coolant grooves (62), along the tool axis (AT).

20. The cutting tool (64) according to claim 18, wherein:
the major holding sub-portion (68a) has a front protuberance (90) extending axially forwardly from the major seating sub-surface (72a),
the front protuberance (90) includes a top coolant exit passage (92) extending along a top coolant exit axis (A4) transverse to the tool axis (AT), and
the top coolant exit passage (92) communicates with the coolant groove (62) associated with the operative cutting portion (32).

21. The cutting tool (64) according to claim 20, wherein:
the front protuberance (90) is entirely located axially rearward of the operative cutting portion's operative cutting edge (44), along the tool axis (AT).

22. The cutting tool (64) according to claim 14, wherein, in an end view of the cutting tool (64):
a center of an imaginary second circle (CC2) having a second radius (R2) ten percent greater than the first radius (R1), is offset from the center of the imaginary first circle (CC1) by an offset distance (DO) in a direction away from the operative cutting portion (32);
the imaginary second circle (CC2) contains the insert holder's major holding sub-portion (68a); and
the imaginary second circle (CC2) further contains the insert's central body portion (30) and the two non-operative cutting portions (32),
and wherein:
the offset distance (DO) is greater than thirty percent of the first radius (R1).

23. The cutting tool (64) according to claim 14, wherein, in an end view of the cutting tool (64):

an imaginary third circle (CC3) having a third radius (R3) ten percent greater than the first radius (R1) and a center coincident with the cutting insert's central axis (A1), contains the entire holding portion (68).

24. The cutting tool (64) according to claim 14, wherein:
the imaginary first and second vertical planes (PV1, PV2) of the operative cutting portion (32) do not intersect the insert holder's minor holding sub-portion (68b).

* * * * *